(12) United States Patent
McCorkindale et al.

(10) Patent No.: US 8,427,680 B2
(45) Date of Patent: Apr. 23, 2013

(54) DELAYED PRINTING FROM A COMPUTERIZED DEVICE

(75) Inventors: Mary Catherine McCorkindale, Fairport, NY (US); Jennifer C. Watts-Perotti, Pittsford, NY (US); Mary Ann Sprague, Macedon, NY (US); Patricia Swenton-Wall, Victor, NY (US); Arturo M. Lorenzo, Fairport, NY (US); Hua Liu, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 550 days.

(21) Appl. No.: 12/716,883

(22) Filed: Mar. 3, 2010

(65) Prior Publication Data

US 2011/0216349 A1 Sep. 8, 2011

(51) Int. Cl.
*G06F 3/12* (2006.01)

(52) U.S. Cl.
USPC .......................................... 358/1.15; 358/1.14

(58) Field of Classification Search .................... 358/1.1, 358/1.15, 1.16, 1.6, 1.13, 437, 438, 439, 358/448; 709/209; 455/552; 710/316, 8, 710/14, 15, 16, 17, 18, 19, 627.2
See application file for complete search history.

(56) References Cited

U.S. PATENT DOCUMENTS

| | | | |
|---|---|---|---|
| 6,032,004 A | 2/2000 | Mirabella, Jr. et al. | |
| 6,147,765 A * | 11/2000 | Yoneda | 358/1.15 |
| 7,461,377 B2 * | 12/2008 | Someshwar et al. | 718/102 |
| 7,518,746 B2 * | 4/2009 | Leiman et al. | 358/1.15 |
| 2002/0069239 A1 * | 6/2002 | Katada et al. | 709/202 |
| 2003/0100335 A1 * | 5/2003 | Gassho et al. | 455/552 |
| 2004/0100651 A1 | 5/2004 | Leone, III et al. | |
| 2004/0194013 A1 | 9/2004 | Nishikawa | |
| 2006/0203282 A1 * | 9/2006 | Iwai | 358/1.15 |
| 2006/0268337 A1 * | 11/2006 | Leiman et al. | 358/1.15 |
| 2008/0055641 A1 * | 3/2008 | Murata et al. | 358/1.15 |
| 2008/0266600 A1 | 10/2008 | Itoh | |
| 2008/0298305 A1 * | 12/2008 | Nakamura | 370/328 |
| 2009/0040554 A1 | 2/2009 | Burke et al. | |
| 2010/0020356 A1 * | 1/2010 | Kawasaki | 358/1.15 |
| 2010/0122010 A1 * | 5/2010 | Yan | 710/316 |

FOREIGN PATENT DOCUMENTS

EP 001091562 * 4/2001

* cited by examiner

*Primary Examiner* — Jerome Grant, II
(74) *Attorney, Agent, or Firm* — Gibb & Riley, LLC

(57) ABSTRACT

A user of a computerized device creates an item capable of being printed and stores the item within storage of the computerized device. An instruction to perform delayed printing of the item is received from a user of a computerized device when the user is outside a predetermined physical range of at least one printing device. The computerized device detects when the computerized device is within the predetermined physical range of the printing device and, when this occurs, the computerized device provides the user a printing option to print the item on the printing device. If the user selects the printing option, the methods herein forward the item to a conversion device. The conversion device makes the item print ready so that the item can be printed using the printing device. The methods herein then cause the item to be forwarded from the conversion device to the printing device and printed on the printing device.

21 Claims, 5 Drawing Sheets

DELAYED PRINTING FROM A COMPUTERIZED DEVICE

BACKGROUND AND SUMMARY

Embodiments herein generally relate to portable devices and printing systems and more particularly relate to a method and apparatus that receive instructions to print an item from a user and delay printing the item until the user is within close proximity of the selected printing device.

Mobile workers may have limited access to printers while on the go; however, the need to print may still exist. For those print jobs that can be deferred until they get to the office, the mobile worker has to remember to print, then find the document, open the document, and finally print it. Some alternative methods for printing from a mobile device only allow users to print to their default printer. The user's computer must be network accessible to the mobile device and turned on. Documents printed from afar to a default printer and picked up later can be a security risk or tend to be lost. Alternatively, mobile print services that send a document to the cloud, do not remind users to print waiting documents when they are near an eligible printer.

The embodiments herein provide a personal print queue where mobile workers can send non-urgent documents to be printed later when they return to the office or other print location. When an individual with a document in their print queue comes into proximity of a discoverable printer, the user's mobile device will alert the user that documents reside in their print queue and a printer is available.

Workers modify their printing behavior based on the accessibility to or capabilities of printers when on the go or at home. More employees are working more often in more places away from their desks and office printers. These potential print users have learned to either work around printer limitations or defer their printing needs.

Typically, people are printing pages containing transient information or documents that they want to read or markup. As one study participants said, "I feel like if it's something that's very dense or complex, I want it printed so I can read it." Some of these documents to be read and possibly marked up are non-urgent deferrable print jobs. Other printed documents are meeting handouts that can be printed once the remote worker is in the office. Another participant said, "It was so huge that I waited until I got to work, because it was 50 some odd pages, full color, and I thought, '... if I have to print five copies of this, it will take my machine forever, and I don't know if I have enough toner in there.'" The problem with deferring printing needs is the need to remember to print later and then find the document. The embodiments herein provide a method and system for making the "defer printing" workflow easier.

Thus, with embodiments herein, a user of a computerized device (such as a portable computer, smart phone, camera phone, portable digital assistant (PDA), etc.) often creates electronic items capable of being printed. Such items can be documents, photographs, presentations, spreadsheets, etc. The printable items can be created using the computerized device maintained by the user, or by a different device.

The user can store the item within the internal storage of the computerized device or can upload the items to another device or network. For example, with embodiments herein the printable items can be temporarily stored within a networked storage device (such as a network cloud environment) to which the computerized device and the printing device have access.

Regardless of where the printable items are stored, the user may desire to print the item even though the user does not have immediate access to an appropriate printing device. Therefore, embodiments herein will receive an instruction to perform delayed printing of the item from a user of the computerized device when the user is outside a predetermined physical range of the printing device. Then, the methods herein wait until the computerized device comes within the predetermined physical range of the printing device or devices.

The methods herein use the computerized device to detect when the computerized device is within the predetermined physical range of the printing device and when this occurs the computerized device provides the user a printing option to print the item on the printing device. More specifically, the embodiments herein can detect when the computerized device is within the predetermined physical range of the printing device using a number of different methods.

For example, if the computerized device is global positioning system (GPS) enabled, the embodiments herein can perform a global positioning system location comparison of the computer with a previously established known global position of one or more printing devices. Alternatively, if the computerized device includes a wireless antenna, the embodiments herein can perform a wireless sensing process to identify the presence of one or more wirelessly enable printing devices. Further, if the computerized device is capable of being connected to a network that includes appropriate printers, the embodiments herein can identify such printers as being available when the network connection is established as being active. The user can also provide the computerized device input (through the graphic user interface) that various printing devices are within the predetermined range if the computerized device does not detect the printing devices.

In some embodiments, the graphic user interface of the computerized device can be used to notify the user of the availability of the various printing devices that are detected as being within the predetermined physical range of the printing device. Further, embodiments herein can also provide the various capabilities of the different printing devices to the user (through the graphic user interface of the computerized device) to allow the user to chose one of the printing device for printing the item. For example, different printing devices that are detected can charge different rates for printing, provide different printing options (color, finishing options, etc.), provide different abilities (quality, paper size, speed, etc.), etc., and the embodiments herein present this information on the graphic user interface of the computerized device to allow the user to make an informed decision of which printing device should be utilized (or even if the printing job should be performed at all).

If the user selects the printing option, the methods herein forward the item to a conversion device. Therefore, the printable items can be forwarded directly from the memory of the computerized device or can be downloaded from the networked storage device. The conversion device converts the item to a "print ready" state so that the item can be printed using the selected printing device. The methods herein also cause the item to be forwarded from the conversion device to the printing device and printed on the printing device. The embodiments herein allow the computerized device to communicate with the selected printing device to determine whether the printing of the item is complete. If the printing of the item is complete, the computerized device notifies the user that the printing of the item is complete.

Embodiments described below also include computer storage mediums and computerized devices. One such computerized device can include a graphic user interface operatively connected to a processor. The graphic user interface receives, from the user, the instruction to perform the delayed printing of the printable item (again, when the user is outside a predetermined physical range of at least one printing device). A detector that is operatively connected to the processor detects when the computerized device is within the predetermined physical range of the printing device.

When the computerized device is within the range of the printing device, the graphic user interface provides the user a printing option to print the item on one or more of the detected printing devices. An input/output device, such as a communications port, is also operatively connected to the processor. If the user selects the printing option, the communications port outputs instructions (and data) that cause the item to be forwarded to the printing device and printed on the printing device. The processor determines whether the printing of the item is complete, and if so, the graphic user interface notifies the user that the printing of the item is complete.

The detector used with embodiments herein can comprise any of a number of different physical devices such as network connection devices (physical or wireless) various wireless antenna devices, GPS devices, etc. Therefore, the detector can detect the printing device by performing a global positioning system location comparison of the computerized device and a previously known position of the printing device, performing a wireless sensing of the printing device, connecting the computerized device to a network associated with the printing device, receiving input from the user that the computerized devices within the range of the printing device, etc.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

With embodiments herein, when a mobile user with documents in their personal print queue comes into proximity of a printer supporting the mobile print service of embodiments herein, the mobile device notifies the user that a printer is in proximity and, if there are multiple documents in the queue, the user can choose which documents in the queue to print. The user can browse the documents in the queue, view the capability of the printer, and select some or all documents to print on the discovered printer. The documents to be printed can be sent to a local or remote service that converts the documents into print-ready files (e.g. PS, PDF, PCL) along with the discovered printer contact information (such as email or IP address). The conversion service forwards the print-ready files to the specified printer. When the print job is completed, the document is removed from the user's personal print queue and the user is notified. Alternatively, the user may set up print preferences that allow the documents in the print queue to be automatically printed and then notify the user of the completed print job.

Any network or printer authentication will occur via the user's network authentication on the mobile device. Interaction is entirely on the mobile device, and the user does not have to physically walk up to a printer until the job has been printed. As currently embodied, this printing solution is useful for private, secure office and enterprise printing where authenticated network access is sufficient for accessing the printers. The embodiments herein provide speed and ease of use without requiring the user to stand in front of the printer or enter numbers in a keypad for the job to be printed. For printers requiring further access control such as for metering/billing, embodiments herein can provide a mechanism for simple authentication from mobile devices maintains ease of use.

Figure 1:
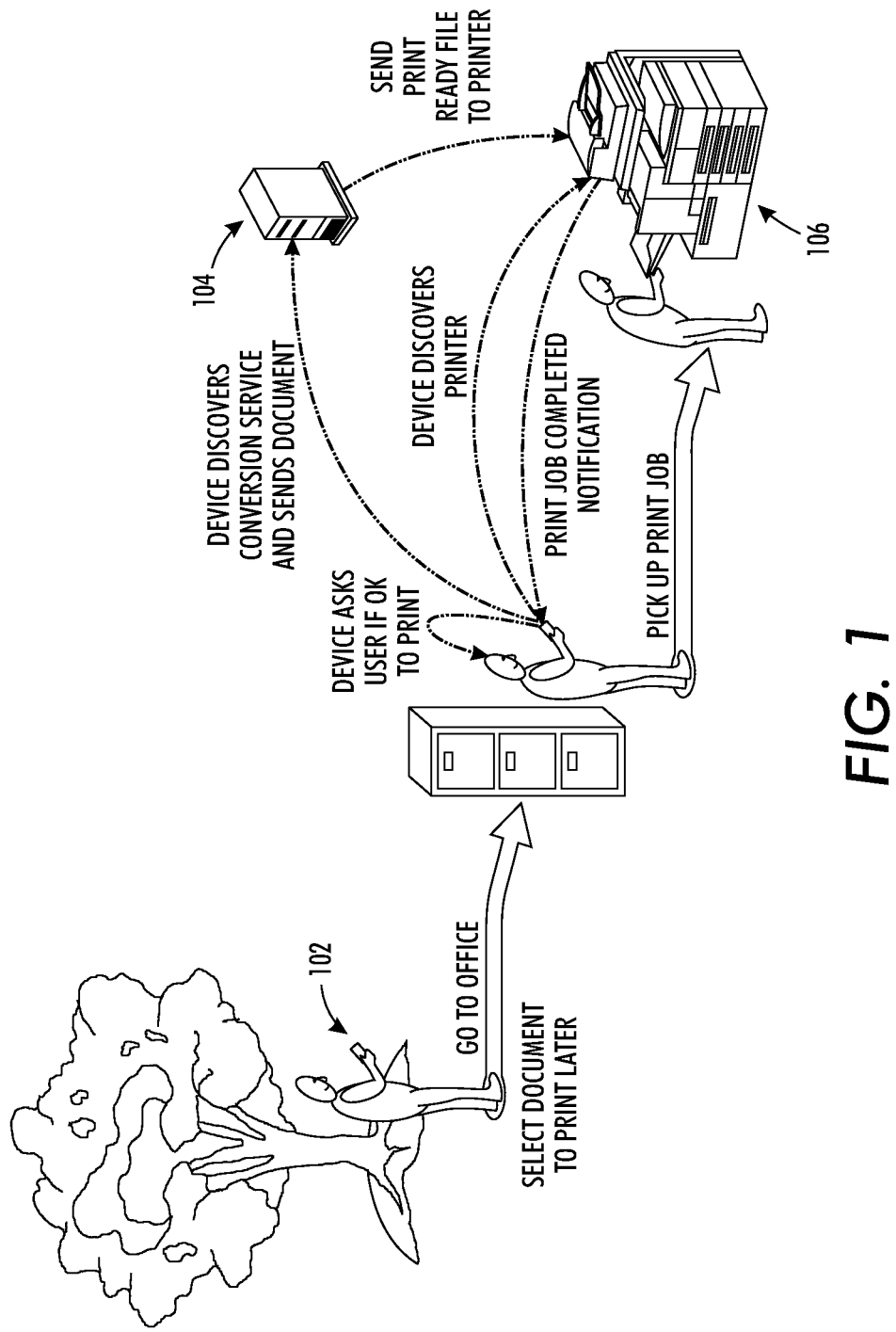
FIG. 1 is a schematic diagram of a device and method according to embodiments herein.

As shown schematically in FIG. 1, one embodiment of the invention performs the following processes. First, in item 11 the mobile user sends a printable item to personal print queue within their computerized device 102 while the user is more than a predetermined distance from an appropriate printing device 106. In item 12, the user returns to the office, and in item 13 the mobile device discovers the printer 106. In item 14 the device asks the user if it is acceptable to print, and the user selects which printable items to print, if more than one is available in the print queue. In item 15 the device discovers a local or remote print-ready conversion device/service 104 and sends the printable item and discovered printer information.

The conversion device 104 is optional and maintains the necessary print drivers and other printer language conversion software that allows the item to be converted from its native format into a format that is needed by the printing device 106 to perform the printing operation. As mentioned, the conversion device 104 can be a local device connected to the local network of the printing device 106 or it can be found through a wide area network, such as a cloud computing network The conversion service to created a print-ready file will not be necessary in every case; for instance, if the delayed print job originates at a laptop.

Next, in item 16 the print-ready file (e.g. PS, PDF, PCL) is sent from the conversion device 104 to the printer 106. When the print job is completed, in item 17 the printable item is removed from the personal print queue and the user is notified. Item 18 illustrates the user retrieving the print job.

As described above, documents to be printed later appear in a personal print queue. When the user comes into proximity of a recognizable printer 106, this queue drops down to reveal the printable items in the queue. The user can select the files to be sent to the printer 106 at that time. If files are not selected, they will remain in the queue until the user prints them or deletes them from the queue.

The personal print queue application is one possible instantiation of the embodiments herein used on the mobile device 102. When a user selects a file that he/she wants to print later, either via a print menu option or sending an e-mail to their personal print queue, the file then appears in the user's personal print queue on the mobile device. Users may choose to view a list of filenames or a thumbnail image of the file. Later, when the user comes into proximity of a discoverable printer 106, the user receives a notification of his/her choosing (like a beep on a smart phone) and the personal print queue menu drops down from the personal print queue icon, showing which printable items are in the queue. The user can choose which printable items he/she wants to print to that printer at the time, or can choose to close the queue and not print at all.

The printable item to be printed later may be saved locally in a queue on the mobile device or alternatively sent directly to a remote personal print queue (in the cloud, enterprise, etc.) depending on the user preferences and print queue availability. The time to live should be until the printable item is printed, the printable item will only be printed once, and only the user submitting the print job is permitted to print it. Documents could be stored and converted on the cloud, while a simple flag (a Boolean variable) indicating whether there are printable items to print is set on the mobile device. When the mobile device finds an eligible local printer, it collects the printer information, sends the information to the cloud, and then the document service sends the print job to the specified printer.

For those mobile devices that neither support moving printable items between applications nor provide cross application access, printable items can be sent to the user's private print queue email address which synchronizes with their device to download the printable items to the mobile device's local print queue. In addition, if an e-mail contains only a link to the printable item to be printed, the print application will retrieve the page or printable item referenced by the link.

Sensing that a device has come into proximity of a recognizable printer can be done by a variety of means. The device could detect via GPS that the device is now at "work", or some form of wireless discovery could be used. When the user with printable items in their personal print queue connects to a network with a print service, the mobile device can discover the print service and notify the mobile device of the print service availability. In addition, other positional recognition processes and systems, whether now known or developed in the future, can be utilized with the embodiments herein to detect the proximity of printing devices.

Embodiments herein recognize that many print jobs are non-urgent and that the user only needs to be reminded of the pending print jobs once a discoverable printer is available. For these non-urgent print jobs, mobile users do not need to go out of their way to find printers not encountered during the normal course of their day. Instead of depending on cloud storage, the print job may be held on the mobile device pending the printer discovery and transferred to the printer wirelessly. Automatic printer discovery makes the non-urgent printing more transparent to the user. Sensitive jobs do not sit at the printer waiting to be picked up. Forgotten print jobs do not clog up a print queue, and jobs are not deleted too early by an automatic deletion policy.

The embodiments herein support automatic interaction among mobile devices, network advertised/discovered print services, and potentially the print submission cloud service, to enable document printing on the user's behalf. Users do not need to know any printer details (such as the printer's web address or email address) or specify a particular printer. A user may need to print a non-urgent job from a mobile device, a laptop, a computer, or even an e-reader. Then when an eligible printer is near-by, whatever device the user is currently using should notify the user of the availability of a printer for the pending print jobs.

Figure 2:
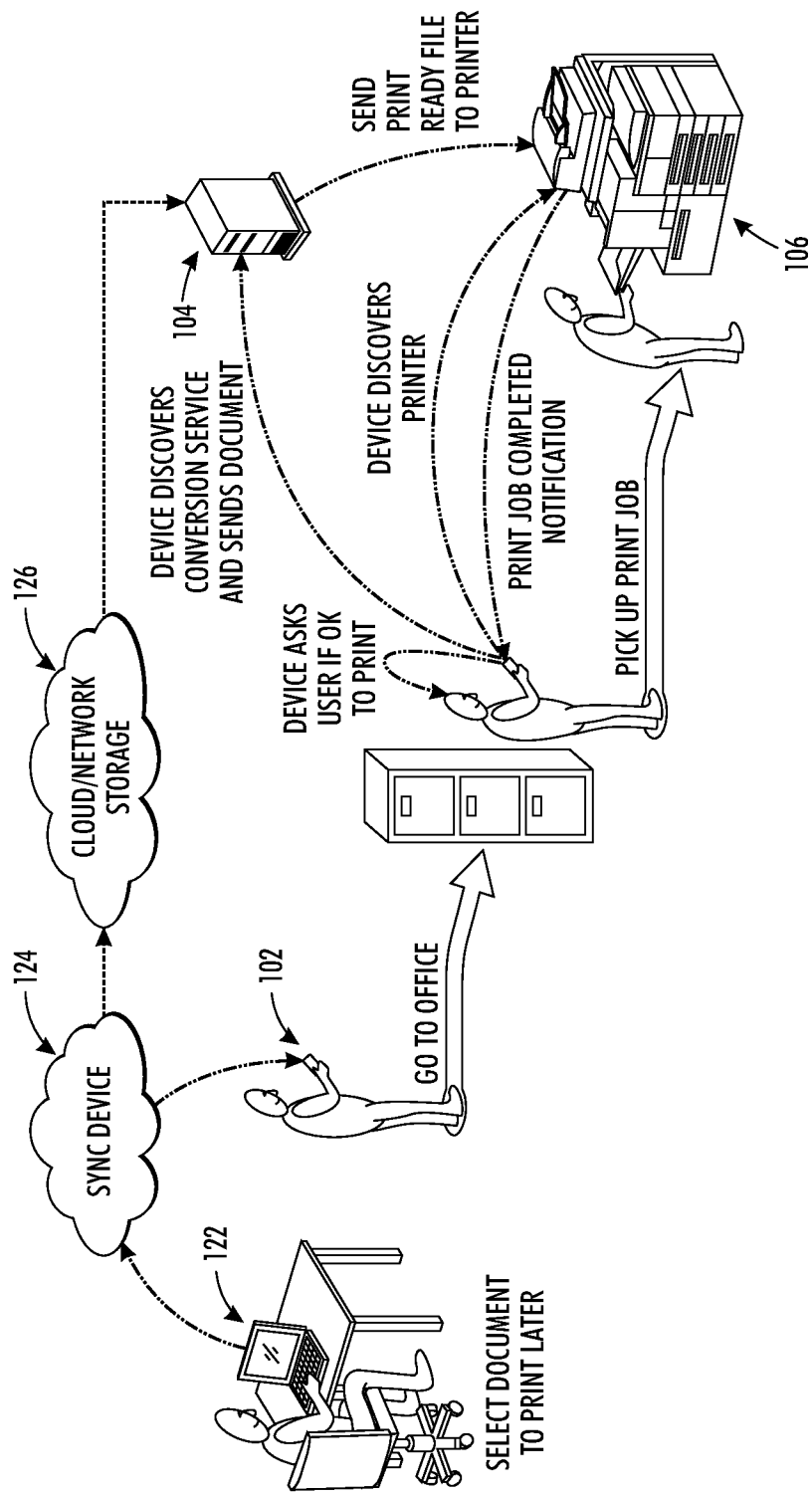
FIG. 2 is a schematic diagram of a device and method according to embodiments herein.
Figure 3:
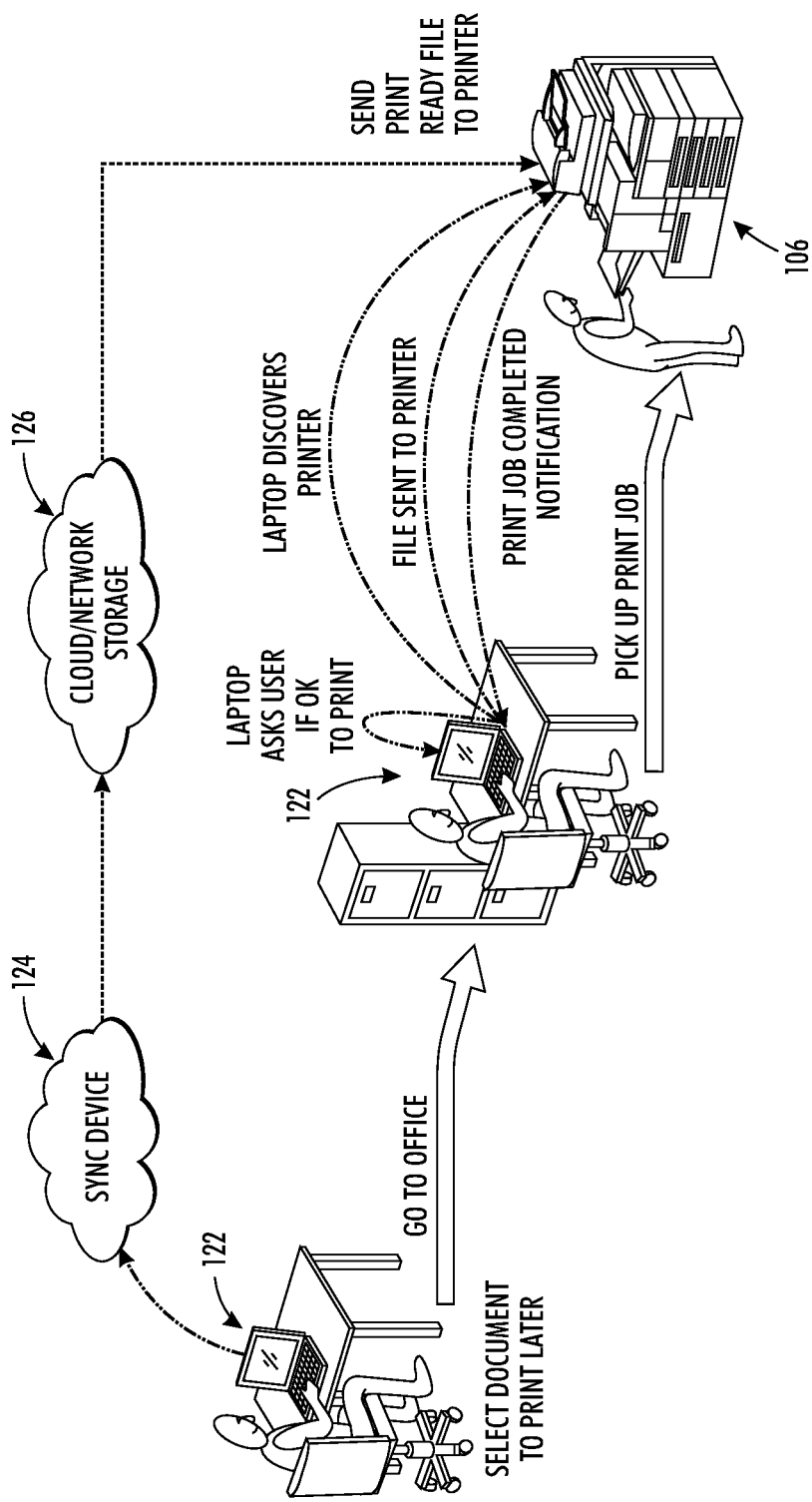
FIG. 3 is a schematic diagram of a device and method according to embodiments herein.

In FIGS. 2 and 3, two similar workflows are described. The first workflow shown in FIG. 2 is appropriate for remote workers who are also mobile and in the course of their day may visit locations with potentially richer printing resources, such as a traditional office, a co-working site, or a coffee shop. The second workflow shown in FIG. 3 illustrates a print solution for a quasi-remote worker, one who frequently works from home or some other location with poor printing resources and also works in another location with richer printing resources in the course of their work week.

More specifically, in FIG. 2, in item 21 the remote user sends a printable item to a personal print queue from their laptop or tablet device 122. In item 22 the printable item is sent to a print sync service/device 124. When the user's mobile device 102 synchronizes with this service/device 124, it receives the new printable item and adds it to the mobile device's print queue. In item 23 the remote user goes to an office or other printing location and, in item 24, the mobile device discovers the printer 106.

In item 25 the device 102 asks the users if it is allowed to print, and the user selects which printable items to print, if more than one is in the queue. In item 26 the device discovers a local or remote print-ready conversion service/device 104 and sends the printable item and discovered printer information. Then, in item 27 the print-ready file (e.g. PS, PDF, PCL) is sent to printer 106. In item 28 when the print job is completed, the printable item is removed from the personal print queue and the user is notified. Finally, in item 29 the user retrieves the print job from the printer 106.

Similarly, in FIG. 3, in item 31 the remote user sends the printable item to their personal print queue from their laptop or tablet device 122. In item 32 the printable item may synchronize with the cloud to be printed from another device; although, in this case the printable item can remain completely on the portable laptop 122.

Next, in item 33 the remote user goes to an office or other printing location and brings their portable computerized device 122 with them. The laptop or tablet device 122 discovers printer in item 24 and, in item 25 the laptop 122 asks user if it is acceptable to print printable items in print queue (and the user selects which printable items to print, if there is more than one). In item 26 the file is sent to the printer. When the print job is completed, in item 27 the printable item is removed from the personal print queue and the user is notified. In item 28 the user retrieves the print job.

In both workflows shown in FIGS. 2 and 3, the user selects a printable item to be printed later from their laptop or desktop computer 122. This printable item enters their "print later" queue. In the first workflow shown in FIG. 2, the printable item to be printed is sent to a print sync service/device 124. The print sync service/device 124 is an apparatus that can perform many functions. For example, the print sync device 124 can perform the conversion service of the conversion device 104, avoiding the need to use such a device. Further, the print sync device 124 can transfer an item (in native format, or print ready format) from one computerized device (e.g., personal computer 122) to a different computerized device (e.g., smart phone 102), using wired or wireless capabilities and networks. In addition, the print sync device 124 can be remotely located on a wide area network (a cloud or the internet) to which both computerized devices 122 and 102 can connect. Therefore, a user may create a document on a non-mobile desktop device in one location, and have the document automatically converted to a print ready format and forwarded to their mobile device by the print sync device 124.

When the user's mobile device 102 synchronizes with this print sync service/device 124, it receives the new printable item and adds it to the mobile printing application on the mobile device's print queue. When sent to the print sync service 124 from the personal computer, the printable item remains there and is also converted to a print ready format. This allows the setting of a simple flag to indicate whether there are printable items on the mobile device 102. When the mobile device 102 finds an eligible local printer, it collects the printer information, sends the information to the cloud, and then the print sync service/device 124 sends the print job to the specified printer 106. One advantage of keeping the printable items on the mobile device 102 is that only local network access is required at the point of printing, and printing can continue even if the internet is not accessible.

Figure 4:
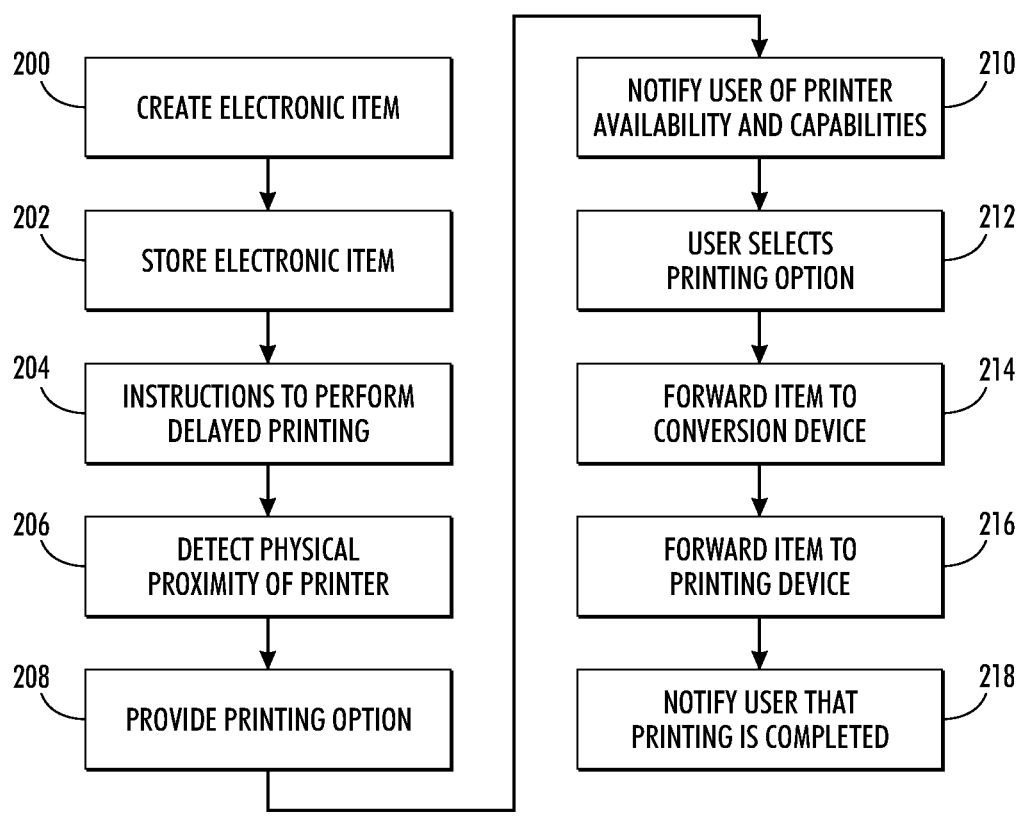
FIG. 4 is a flowchart illustrating methods according to embodiments herein.
Figure 5:
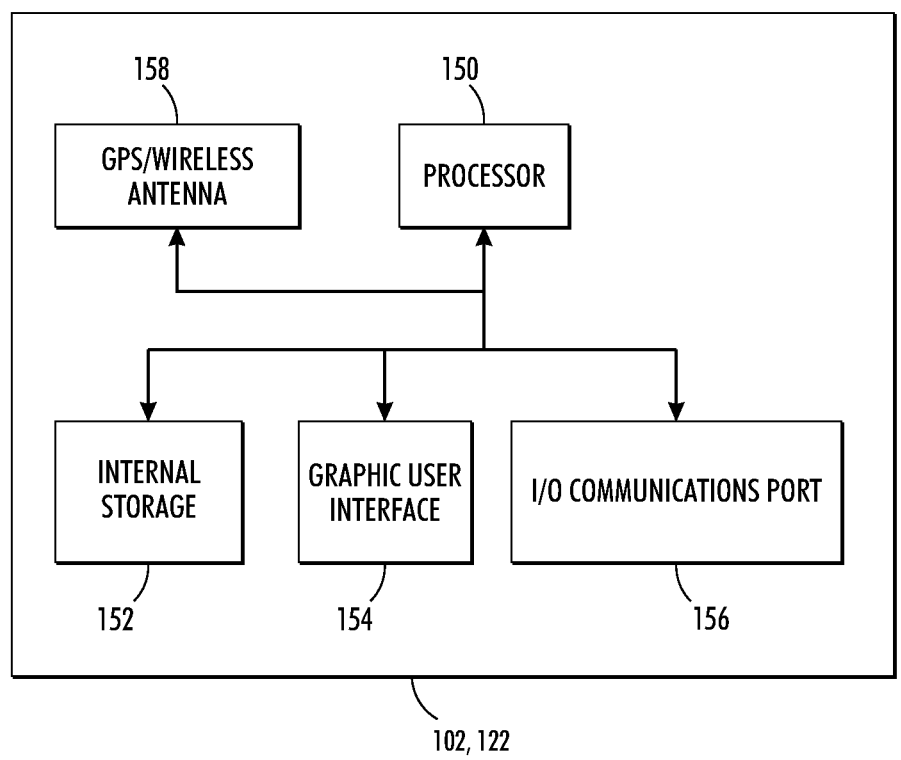
FIG. 5 is a schematic diagram of a computerized device according to embodiments herein.

Therefore, as shown in flowchart form in FIG. 4 and schematic form in FIG. 5, a user of a computerized device 102, 122 (such as a portable computer 122, smart phone 102, camera phone, portable digital assistant (PDA), etc.) often creates electronic items capable of being printed (flowchart item 200). Such items can be documents, photographs, presentations, spreadsheets, etc. and/or any other similar item that is capable of being printed (whether currently known or developed in the future).

The printable items can be created using the computerized device 102, 122 maintained by the user, or by a different device. For example, the user may create a document using their laptop computer 122 and transfer the document to their smart phone 102. Alternatively, the user may take a photograph with a camera and transfer the image file to their smart phone 102. Also, the user made create a document or take a photograph using their smart phone and maintain such an electronic printable item within their smart phone 102.

The user can store the item within the internal storage 152 of the computerized device 102, 122 or can upload the items to another device or network 126 (flowchart item 202). For example, with embodiments herein the printable items can be temporarily stored within a network storage device (such as a network cloud environment 126) to which the computerized device 102, 122 and the printing device 106 have access. Thus, with embodiments herein, the user can maintain the printable item within their smart phone 102, portable computer 122, a memory stick, etc. Additionally, if a user is connected to a local or wide area network, the user can immediately store the printable item within a networked storage device. Additionally, third party cloud storage 126 resources can be utilized to store the print item, if available.

Regardless of where the printable items are stored, the user may desire to print the item even though the user does not have immediate access to an appropriate printing device 106. For example, the user may be in close proximity and have access to a local printing device; however, that local printing device may not be appropriate for the print job the user is currently contemplating (either because of cost reasons, performance reasons, capability reasons, etc.). In order to allow the user to immediately make a print command to an appropriate printer, the embodiments herein allow the user to select an appropriate printer or class of printer and to delay printing the item on that printer until the user is in close proximity to the selected printer. In this operation, the user can select a specific printer (e.g., the one closest to their desk) or can select a class of printers (e.g., a color laser printer with a minimum resolution).

Thus, embodiments herein will receive an instruction to perform delayed printing of the item from a user of the computerized device 102, 122 when the user is outside a predetermined physical range (e.g., within one-quarter of a mile, 100 meters, 50 feet; within the same building; on the same floor in a building; within a specific room; etc.) of the printing device 106 (flowchart item 204). Then, the methods herein wait until the computerized device 102, 122 comes within the predetermined physical range of the printing device or devices 106.

The methods herein use the computerized device 102, 122 to detect when the computerized device 102, 122 is within the predetermined physical range of the printing device 106 (flowchart item 206) and when this occurs the computerized device 102, 122 provides the user a printing option to print the item on the printing device 106 (flowchart item 208).

More specifically, in item 206, the embodiments herein can detect when the computerized device 102, 122 is within the predetermined physical range of the printing device 106 using a number of different methods. For example, if the computerized device 102, 122 has a global positioning system (GPS) enabled, the embodiments herein can perform a global positioning system location comparison of the computer with a previously established known global position of one or more printing devices 106. Alternatively, if the computerized device 102, 122 includes a wireless fidelity (WiFi) antenna, the embodiments herein can perform a wireless sensing process to identify the presence of one or more wirelessly enabled printing devices 106. Further, if the computerized device 102, 122 is capable of being connected to a network that includes appropriate printers, the embodiments herein can identify such printers as being available when the network connection is established as being active (when the computerized device connects to a network router (wired or wireless)). The user can also notify the computerized device 102, 122 through input to the graphic user interface 154 that various printing devices 106 are within the predetermined range.

In some embodiments, the graphic user interface 154 of the computerized device 102, 122 can be used to notify the user of the availability of the various printing devices 106 that are detected as being within the predetermined physical range of the printing device 106 (flowchart item 210) even if such specific printers were not originally selected by the user. The embodiments herein constantly detect the different printing devices that are within the predetermined range of the computerized device 102, 122 to evaluate whether a printing device that is similar to the printing device selected by the user is available.

Thus, if the computerized device 102, 122 detects that there is a printer that is similar to the printer selected by the user (and that has the same capabilities as the printer selected by the user) within the predetermined physical range, the embodiments herein will notify the user through the graphic user interface 154 and allow the user to change their designation of the selected printer to the one that the computerized device 102, 122 has identified as being within the predetermined physical range. In other words, the user may select a specific printer close to their office desk as the printer that should print the delayed printing job; however, on the way to their office, the user may stop by a different branch office that has the same printer. In such a situation, the embodiments herein would notify the user that such a printer is available and allow the user to change the selection of the desired printer from the one in their office to the one at the branch office.

Further, if multiple matching printers are within the predetermined physical range, embodiments herein can also display the various capabilities of the different printing devices 106 to the user (through the graphic user interface 154 of the computerized device 102, 122) to allow the user to chose one of the printing device 106 for printing the item. For example, different printing devices 106 that are detected can charge different rates for printing, provide different printing options (color, finishing options, etc.), provide different abilities (quality, paper size, speed, etc.), etc., and the embodiments herein present this information on the graphic user interface 154 of the computerized device 102, 122 to allow the user to make an informed decision of which printing device 106 should be utilized (or even if the printing job should be performed at all).

If the user selects the option to begin the actual printing of the item of a (flowchart item 212), the methods herein forward the item to a conversion device 104 (flowchart item 214). Therefore, the printable items can be forwarded directly from the memory of the computerized device 102, 122 or can be downloaded from the networked storage device 126. The conversion device 104 converts the item to a "print ready" state so that the item can be printed using the selected printing device 106 (flowchart item 214). The methods herein also then cause the item to be forwarded from the conversion device 104 to the printing device 106 and printed on the printing device 106 (flowchart item 216). The embodiments herein also allow the computerized device 102, 122 to communicate with the selected printing device 106 to determine whether the printing of the item is complete. If the printing of the item is complete, the computerized device 102, 122 notifies the user that the printing of the item is complete (flowchart item 218).

As shown in FIG. 5, embodiments described below also include computer storage mediums 152 and computerized devices 102, 122. One such computerized device 102, 122 can include a graphic user interface 154 operatively connected to a processor 150. As described above, the graphic user interface 154 receives, from the user, the instruction to perform the delayed printing of the printable item (again, when the user is outside a predetermined physical range of at least one printing device 106). A detector that is operatively connected to the processor 150 detects when the computerized device 102, 122 is within the predetermined physical range of the printing device 106.

As also described above, when the computerized device 102, 122 is within the range of the printing device 106, the graphic user interface 154 provides the user a printing option to print the item on one or more of the detected printing devices 106. Additionally, an input/output device 156, such as a communications port, is also operatively connected to the processor 150. If the user selects the printing option, the communications port 156 outputs instructions (and potentially data) that cause the item to be forwarded to the printing device 106 and printed on the printing device 106. The processor 150 is in direct or indirect communication with the printing device 106 and, therefore, determines whether the printing of the item is complete. If so, the graphic user interface 154 notifies the user that the printing of the item is complete.

The detector used with embodiments herein can comprise any of a number of different physical devices such as network connection devices (wired 156 or wireless 158); various wireless antenna devices, GPS devices (158); etc. Therefore, the detector (156, 158) can detect the printing device 106 by performing a global positioning system location comparison of the computerized device 102, 122 and a previously known position of the printing device 106; performing a wireless sensing of the printing device 106, connecting the computerized device 102, 122 to a network associated with the printing device 106; receiving input from the user that the computerized devices 102, 122 within the range of the printing device 106, through the graphic user interface 154; etc.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
providing, to a user of a computerized device, a delayed printing option based on said computerized device being outside a predetermined physical range of at least one printing device;
receiving, from said user of said computerized device, in response to said delayed printing option, an instruction to perform delayed printing of an item capable of being printed;
detecting, using said computerized device, when said computerized device is within said predetermined physical range of said printing device;
based on said computerized device coming within said range of said printing device, providing said user a printing option to print said item on said printing device, using said computerized device; and
if said user selects said printing option, causing said item to be forwarded to said printing device and printed on said printing device.

2. A method comprising:
receiving, from a user of a computerized device, an instruction to perform delayed printing of an item capable of being printed when said computerized device is outside a predetermined physical range of at least one printing device;
detecting, using said computerized device, when said computerized device is within said predetermined physical range of said printing device;
when said computerized device is within said range of said printing device, providing said user a printing option to print said item on said printing device, using said computerized device; and if said user selects said printing option, causing said item to be forwarded to said printing device and printed on said printing device, said detecting of said printing device comprising at least one of:

performing a global positioning system location comparison of said computerized device and said printing device, using said computerized device;

performing a wireless sensing of said printing device, using said computerized device;

connecting said computerized device to a network associated with said printing device; and receiving input from said user that said computerized device is within said range of said printing device.

3. The method according to claim 2, further comprising notifying, using said computerized device, said user of an availability of a plurality of printing devices within said physical range of said computerized device; and providing capabilities of said printing devices to said user using said computerized device to allow said user to choose a single printing device from said printing devices for printing said item.

4. The method according to claim 2, said item being created using one of said computerized device and a different computerized device.

5. The method according to claim 2, further comprising determining whether said printing of said item is complete using said computerized device; and if said printing of said item is complete, notifying said user that said printing of said item is complete using said computerized device.

6. A method comprising:

receiving, from a user of a computerized device, an instruction to perform delayed printing of an item capable of being printed when said computerized device is outside a predetermined physical range of at least one printing device;

detecting, using said computerized device, when said computerized device is within said predetermined physical range of said printing device;

when said computerized device is within said range of said printing device, providing said user a printing option to print said item on said printing device, using said computerized device;

temporarily storing said item within a networked storage device to which said computerized device and said printing device have access: and if said user selects said printing option, forwarding said item from said networked storage device to said printing device and printing said item using said printing device.

7. A method comprising:

creating, by a user of a computerized device, an item capable of being printed;

storing said item within storage of said computerized device;

receiving, from a user of a computerized device, an instruction to perform delayed printing of said item when said computerized device is outside a predetermined physical range of at least one printing device;

detecting, using said computerized device, when said computerized device is within said predetermined physical range of said printing device;

when said computerized device is within said range of said printing device, providing said user a printing option to print said item on said printing device, using said computerized device;

if said user selects said printing option, forwarding said item from said computerized device to a conversion device, said conversion device making said item ready to be printed using said printing device; and causing said item to be forwarded from said conversion device to said printing device and printed on said printing device, said detecting of said printing device comprising at least one of:

performing a global positioning system location comparison of said computerized device and said printing device, using said computerized device;

performing a wireless sensing of said printing device, using said computerized device:

connecting said computerized device to a network associated with said printing device; and receiving input from said user that said computerized device is within said range of said printing device.

8. The method according to claim 7, further comprising notifying, using said computerized device, said user of an availability of a plurality of printing devices within said physical range of said computerized device; and providing capabilities of said printing devices to said user using said computerized device to allow said user to choose a single printing device from said printing devices for printing said item.

9. The method according to claim 7, said item being created using one of said computerized device and a different computerized device.

10. The method according to claim 7, further comprising determining whether said printing of said item is complete using said computerized device; and if said printing of said item is complete, notifying said user that said printing of said item is complete using said computerized device.

11. A computerized device comprising:

a processor;

a graphic user interface operatively connected to said processor, said graphic user interface provides, to a user of a computerized device, a delayed printing option based on said computerized device being outside a predetermined physical range of at least one printing device, and said graphic user interface receives, from said user, in response to said delayed printing option, an instruction to perform delayed printing of an item capable of being printed;

a detector operatively connected to said processor, said detector detects when said computerized device is within said predetermined physical range of said printing device, and based on said computerized device coming within said range of said printing device, said graphic user interface provides said user a printing option to print said item on said printing device; and a communications port operatively connected to said processor, if said user selects said printing option, said communications port outputs instructions and data that cause said item to be forwarded to said printing device and printed on said printing device.

12. A computerized device comprising:

a processor;

a graphic user interface operatively connected to said processor, said graphic user interface receives, from a user, an instruction to perform delayed printing of an item capable of being printed when said computerized device is outside a predetermined physical range of at least one printing device;

a detector operatively connected to said processor, said detector detects when said computerized device is within said predetermined physical range of said printing device, and when said computerized device is within said range of said printing device, said graphic user interface provides said user a printing option to print said item on said printing device; and a communications port operatively connected to said processor, if said user selects said printing option, said communications port outputs instructions and data that cause said item to be forwarded to said printing device and printed on said printing device, said detector detects said printing device by at least one of:
performing a global positioning system location comparison of said computerized device and said printing device, using said computerized device;
performing a wireless sensing of said printing device, using said computerized device;
connecting said computerized device to a network associated with said printing device; and
receiving input from said user that said computerized device is within said range of said printing device.

13. The computerized device according to claim 12, said graphic user interface notifies said user of an availability of a plurality of printing devices within said physical range of said computerized device; and
said graphic user interface provides capabilities of said printing devices to said user to allow said user to choose a single printing device from said printing devices for printing said item.

14. The computerized device according to claim 12, said item being created using one of said computerized device and a different computerized device.

15. The computerized device according to claim 12, said processor determines whether said printing of said item is complete; and
if said printing of said item is complete, said graphic user interface notifies said user that said printing of said item is complete.

16. A computerized device comprising:
a processor;
a graphic user interface operatively connected to said processor, said graphic user interface receives, from a user, an instruction to perform delayed printing of an item capable of being printed when said computerized device is outside a predetermined physical range of at least one printing device;
a detector operatively connected to said processor, said detector detects when said computerized device is within said predetermined physical range of said printing device, and when said computerized device is within said range of said printing device, said graphic user interface provides said user a printing option to print said item on said printing device; and
a communications port operatively connected to said processor, said communications port temporarily stores said item within a networked storage device to which said computerized device and said printing device have access, and, if said user selects said printing option, said communications port outputs instructions and data that cause said item to be forwarded to said printing device and printed on said printing device, and said communications port causes said item to be forwarded from said networked storage device to said printing device.

17. A non-transitory computer storage medium tangibly storing instructions executable by a computerized device, said instructions causing said computerized device to perform a method comprising:
receiving, from a user of said computerized device, an instruction to perform delayed printing of an item capable of being printed when said computerized device is outside a predetermined physical range of at least one printing device;
detecting, using said computerized device, when said computerized device is within said predetermined physical range of said printing device;
when said computerized device is within said range of said printing device, providing said user a printing option to print said item on said printing device, using said computerized device; and
if said user selects said printing option, causing said item to be forwarded to said printing device and printed on said printing device,
said detecting of said printing device comprising at least one of:
performing a global positioning system location comparison of said computerized device and said printing device, using said computerized device;
performing a wireless sensing of said printing device, using said computerized device:
connecting said computerized device to a network associated with said printing device; and
receiving input from said user that said computerized device is within said range of said printing device.

18. The non-transitory computer storage medium according to claim 17, said method further comprising notifying, using said computerized device, said user of an availability of a plurality of printing devices within said physical range of said computerized device; and
providing capabilities of said printing devices to said user using said computerized device to allow said user to choose a single printing device from said printing devices for printing said item.

19. The non-transitory computer storage medium according to claim 17, said item being created using one of said computerized device and a different computerized device.

20. The non-transitory computer storage medium according to claim 17, said method further comprising determining whether said printing of said item is complete using said computerized device; and
if said printing of said item is complete, notifying said user that said printing of said item is complete using said computerized device.

21. A non-transitory computer storage medium tangibly storing instructions executable by a computerized device, said instructions causing said computerized device to perform a method comprising:
receiving, from a user of a computerized device, an instruction to perform delayed printing of an item capable of being printed when said computerized device is outside a predetermined physical range of at least one printing device;
detecting, using said computerized device, when said computerized device is within said predetermined physical range of said printing device;
when said computerized device is within said range of said printing device, providing said user a printing option to print said item on said printing device, using said computerized device.

temporarily storing said item within a networked storage device to which said computerized device and said printing device have access; and if said user selects said printing option, forwarding said item from said networked storage device to said printing device and printing said item using said printing device.

* * * * *